United States Patent
Wang

(10) Patent No.: US 10,988,202 B2
(45) Date of Patent: Apr. 27, 2021

(54) BICYCLE FOLDING MECHANISM

(71) Applicant: Shuo-Feng Wang, Changhua (TW)

(72) Inventor: Shuo-Feng Wang, Changhua (TW)

(*) Notice: Subject to any disclaimer, the term of this patent is extended or adjusted under 35 U.S.C. 154(b) by 293 days.

(21) Appl. No.: 16/203,758

(22) Filed: Nov. 29, 2018

(65) Prior Publication Data
US 2019/0168836 A1 Jun. 6, 2019

(30) Foreign Application Priority Data

Dec. 4, 2017 (TW) ................................ 106142439
Aug. 20, 2018 (TW) ................................ 107129026

(51) Int. Cl.
*B62K 15/00* (2006.01)
*B62K 3/02* (2006.01)
*B62K 21/02* (2006.01)
*B62K 25/24* (2006.01)
*B62K 25/12* (2006.01)

(52) U.S. Cl.
CPC .............. *B62K 15/006* (2013.01); *B62K 3/02* (2013.01); *B62K 15/00* (2013.01); *B62K 21/02* (2013.01); *B62K 25/12* (2013.01); *B62K 25/24* (2013.01); *B62K 2201/04* (2013.01)

(58) Field of Classification Search
CPC ................................ B62K 25/12; B62K 25/24
USPC ................................................. 280/287, 278
See application file for complete search history.

(56) References Cited

U.S. PATENT DOCUMENTS

| 645,145 A | 3/1900 | Trebert |
| 7,229,089 B2 | 6/2007 | Mihelic |
| 9,132,882 B2 | 9/2015 | Walton |
| 2005/0001404 A1 | 1/2005 | Mihelic |
| 2006/0006624 A1 | 1/2006 | Mihelic |
| 2007/0222175 A1 | 9/2007 | Mihelic |
| 2013/0093161 A1* | 4/2013 | Savsek ................. B62K 15/006 280/287 |

FOREIGN PATENT DOCUMENTS

| CN | 201494567 U | 6/2010 |
| CN | 203127064 U | 8/2013 |
| CN | 204956793 U | 1/2016 |
| CN | 205499224 U | 8/2016 |
| CN | 206664826 U | 11/2017 |
| CN | 207809642 U | 9/2018 |
| DE | 1505227 A1 | 3/1970 |

(Continued)

*Primary Examiner* — Ruth Ilan
*Assistant Examiner* — Hosam Shabara
(74) *Attorney, Agent, or Firm* — Alan D. Kamrath; Karin L. Williams; Mayer & Williams PC

(57) ABSTRACT

A bicycle folding mechanism includes a frame, a stem, and a front fork. The frame includes a front tube at an end thereof. The stem is inserted into the front tube. The stem is connected and pivotal relative to the frame. The stem has an end, which is adjacent to the frame, connected with a connecting seat. The front fork includes at least one connecting end and at least one front end on opposite ends. The at least one connecting end is connected and pivotal relative to the connecting seat such that the front fork is pivotal relative to the connecting seat. The front fork is pivotal between a deployed position in which the at least one front end is positioned away from the frame and a folded position in which the at least one front end is positioned adjacent to the frame.

15 Claims, 20 Drawing Sheets

(56) References Cited

FOREIGN PATENT DOCUMENTS

| DE | 10120479 A1 | 5/2003 |
|---|---|---|
| TW | M540087 U | 4/2017 |
| TW | M551154 U | 11/2017 |
| TW | M562256 U | 6/2018 |
| WO | WO2004024546 A1 | 3/2004 |

\* cited by examiner

BICYCLE FOLDING MECHANISM

BACKGROUND OF THE INVENTION

1. Field of the Invention

The present invention relates to a folding mechanism and, particularly, to a bicycle folding mechanism.

2. Description of the Related Art

TW Pat. No. M551154 discloses a foldable bicycle structure that can be easily towed. The folding bicycle structure includes a tube which includes a first folding mechanism and a second folding mechanism. The tube forms a front tube, a middle tube and a rear tube. The first folding mechanism interconnects the front tube and the middle tube. The second folding mechanism interconnects the middle tube and the rear tube. The front tube has a front end connected with a head tube. The rear tube has a rear end connected with a seat tube. The seat tube is connected with a foot stand. The head tube is pivotally connected with a front fork. An upper end of the head tube is connected with a handle tube by a third folding mechanism. A rear fork is connected to the seat tube. A wheel frame is disposed above the rear fork. The wheel frame, away from the end of the rear fork, has two sides and each side respectively includes an auxiliary wheel disposed thereon. A pull rod is disposed on the top of the horizontal tube.

China Pat. No. 201220638144.6 discloses a folding bicycle. The bicycle includes a frame, a front wheel, a rear wheel, a steering device and a seat. A front fork is connected with a front end of the frame. The front wheel is connected with the front fork. The steering device is connected with a top of the front fork through a hinged folding bracket that can be opened and closed. A top of the steering device includes a handle. The rear wheel is connected with a rear end of the frame. The seat is connected with the frame through a seat support bar which can open and close.

The front fork is pivoted backward by rotating a shaft of the steering device to achieve the folding effect when folding the folding bicycle. In order to greatly change the position of the front fork, the forearm must extend in a direction almost vertical to the shaft of the steering device. However, this entails a long distance between the wheel axle and the shaft of the steering device, and not only increases the stress on the front fork, but also the difficulties in steering operations.

China Pat. No. 201720346443.5 discloses a luggage rack type electric vehicle. The electric vehicle includes a beam, a handle, a front fork, a front wheel, a seat cushion, a rear axle, a rear wheel, and a rear support mechanism. The beam is a wide plate with a notch at a front end and with the seat cushion and a seat mounting hole at a rear end. The handle is connected to an upper end of the front fork through a hinge portion. The handle can be longitudinally folded to the front of the front wheel through the hinge portion. The upper end of the front fork is rotatably connected with the notch of the front end of the beam by a rotating shaft, thereby the front wheel can be rotated to a bottom surface of the beam. A bottom portion of the rear end of the beam is rotatably connected with the rear axle. The rear support mechanism is rotatably fixed to two sides of an axle of the rear wheel. A bottom portion of the rear support mechanism includes a pair of runners mounted on both sides of the rear wheel. The seat cushion is movably mounted on the seat mounting hole.

The electric vehicle includes a rotating shaft interconnecting the front fork and the handle and pivotally connected with the beam. In this regard, the entire head of the vehicle is pivotal to the beam. This construction is a weak construction and the rotating shaft is easily damaged by weight or repeated vibration.

The present invention is, therefore, intended to obviate or at least alleviate the problems encountered in the prior art.

SUMMARY OF THE INVENTION

According to the present invention, a bicycle folding mechanism includes a frame, a stem, and a front fork. The frame includes a front tube at an end thereof. The stem is inserted into the front tube. The stem is connected and pivotal relative to the frame. The stem has an end, which is adjacent to the frame, connected with a connecting seat and the connecting seat rotates in synchronization with the stem upon pivoting the stem with respect to the frame. The front fork includes at least one connecting end and at least one front end on opposite ends. The at least one connecting end is connected and pivotal relative to the connecting seat such that the front fork is pivotal relative to the connecting seat. The front fork is pivotal between a deployed position in which the at least one front end is positioned away from the frame and a folded position in which the at least one front end is positioned adjacent to the frame.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
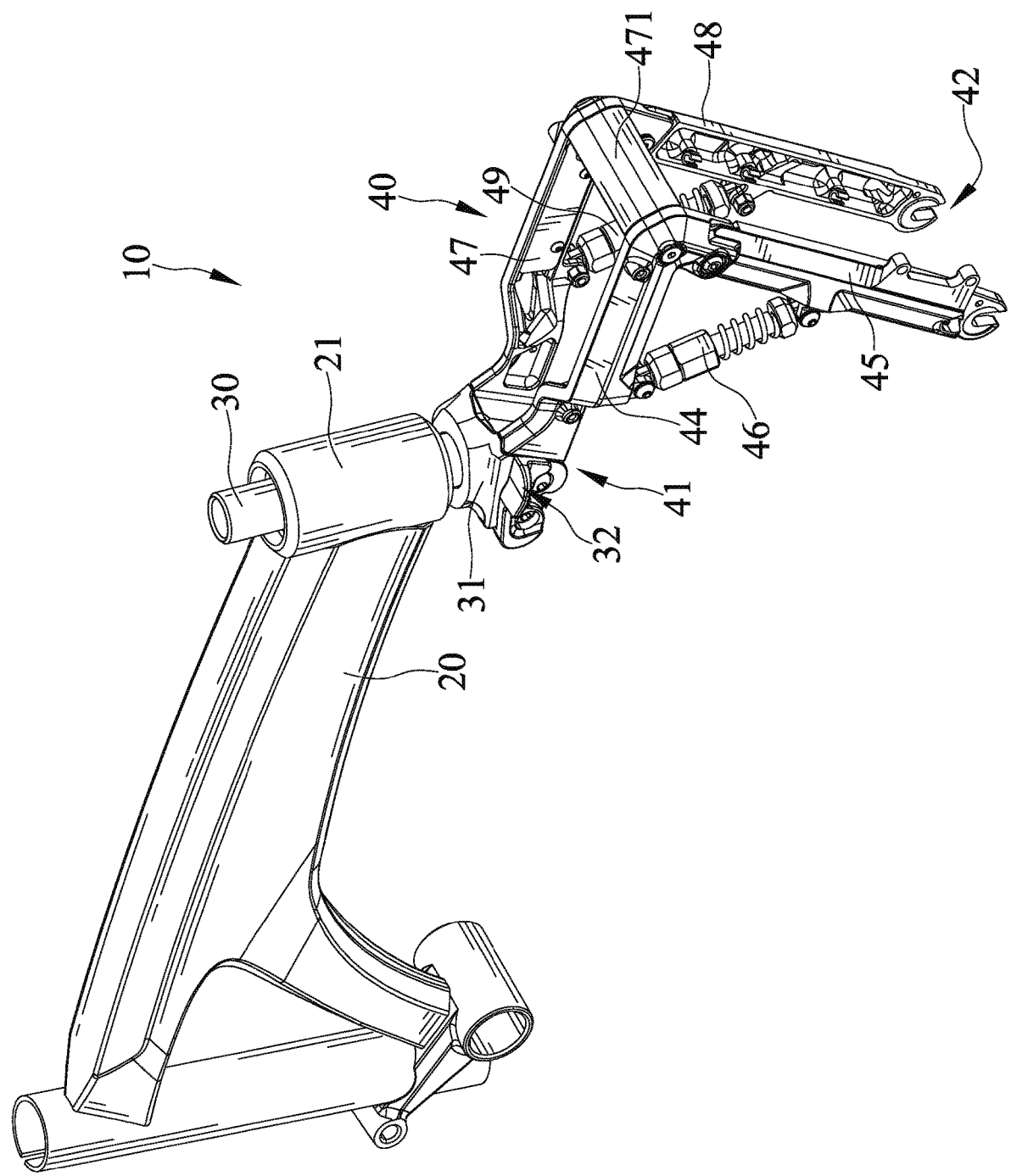
FIG. 1 is a perspective view of a bicycle folding mechanism according to a first embodiment of the present invention.
Figure 2:
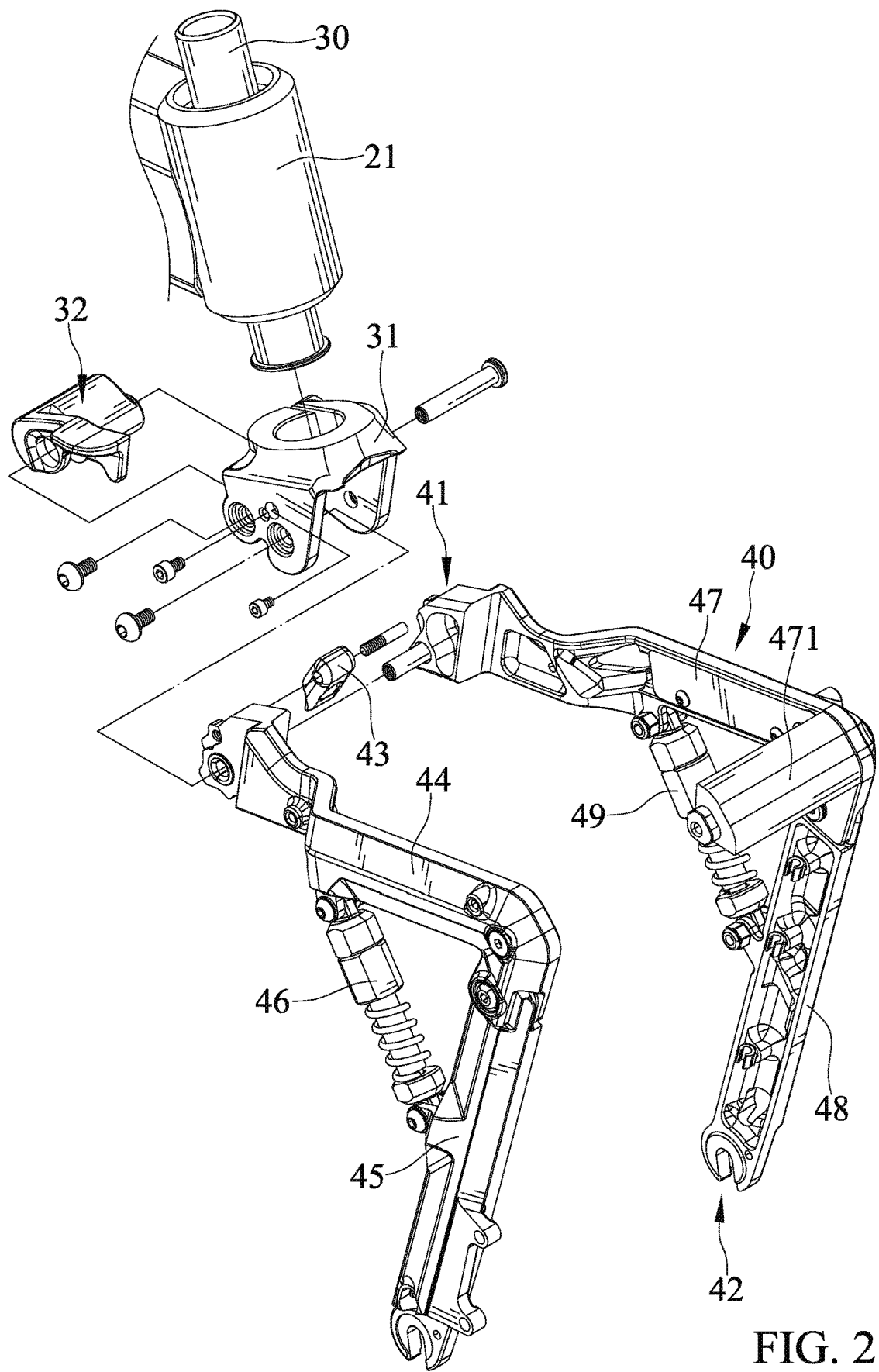
FIG. 2 is an exploded perspective view of the bicycle folding mechanism of FIG. 1.
Figure 3:
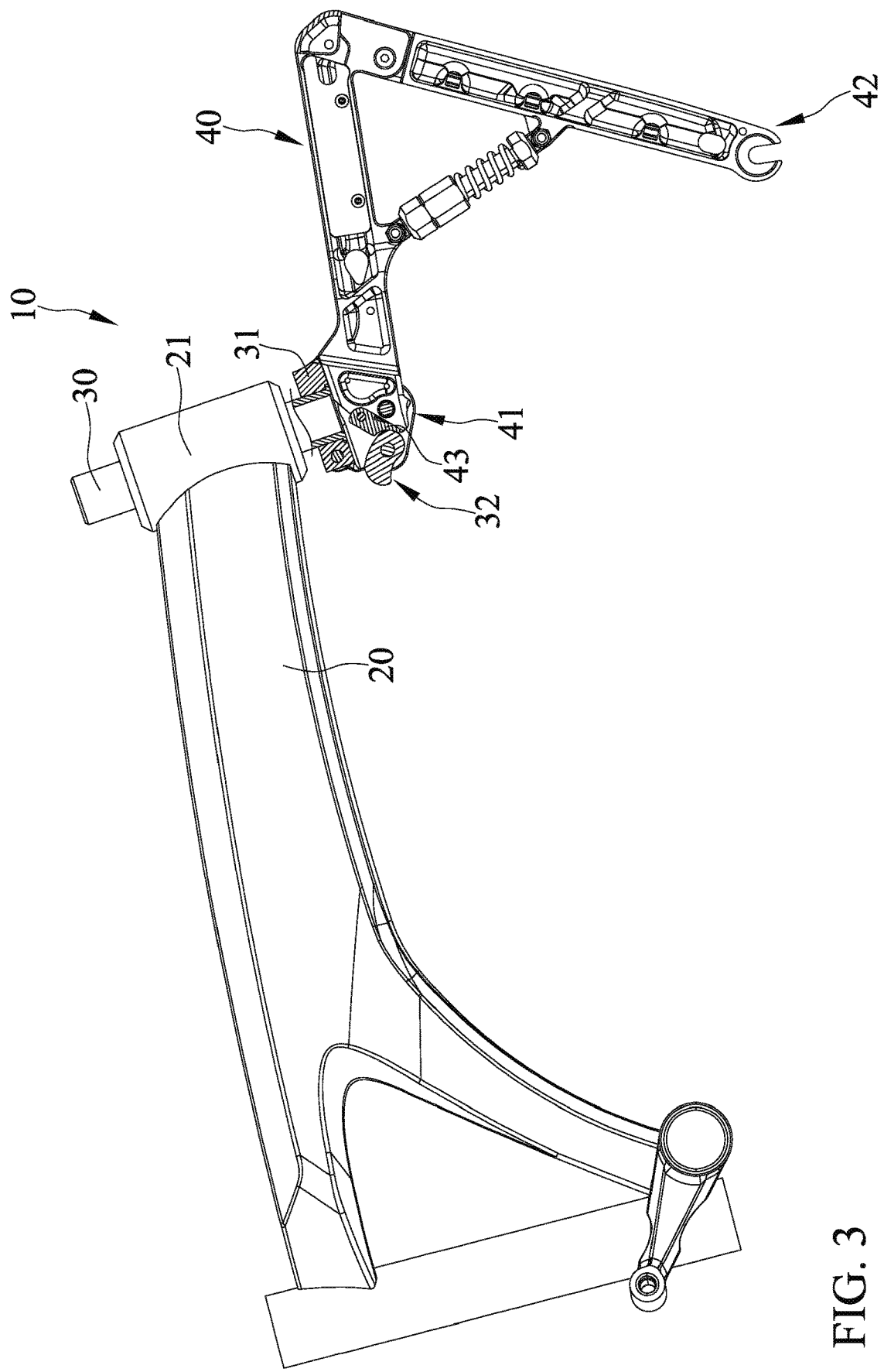
FIG. 3 is a cross-sectional view of the bicycle folding mechanism of FIG. 1.
Figure 4:
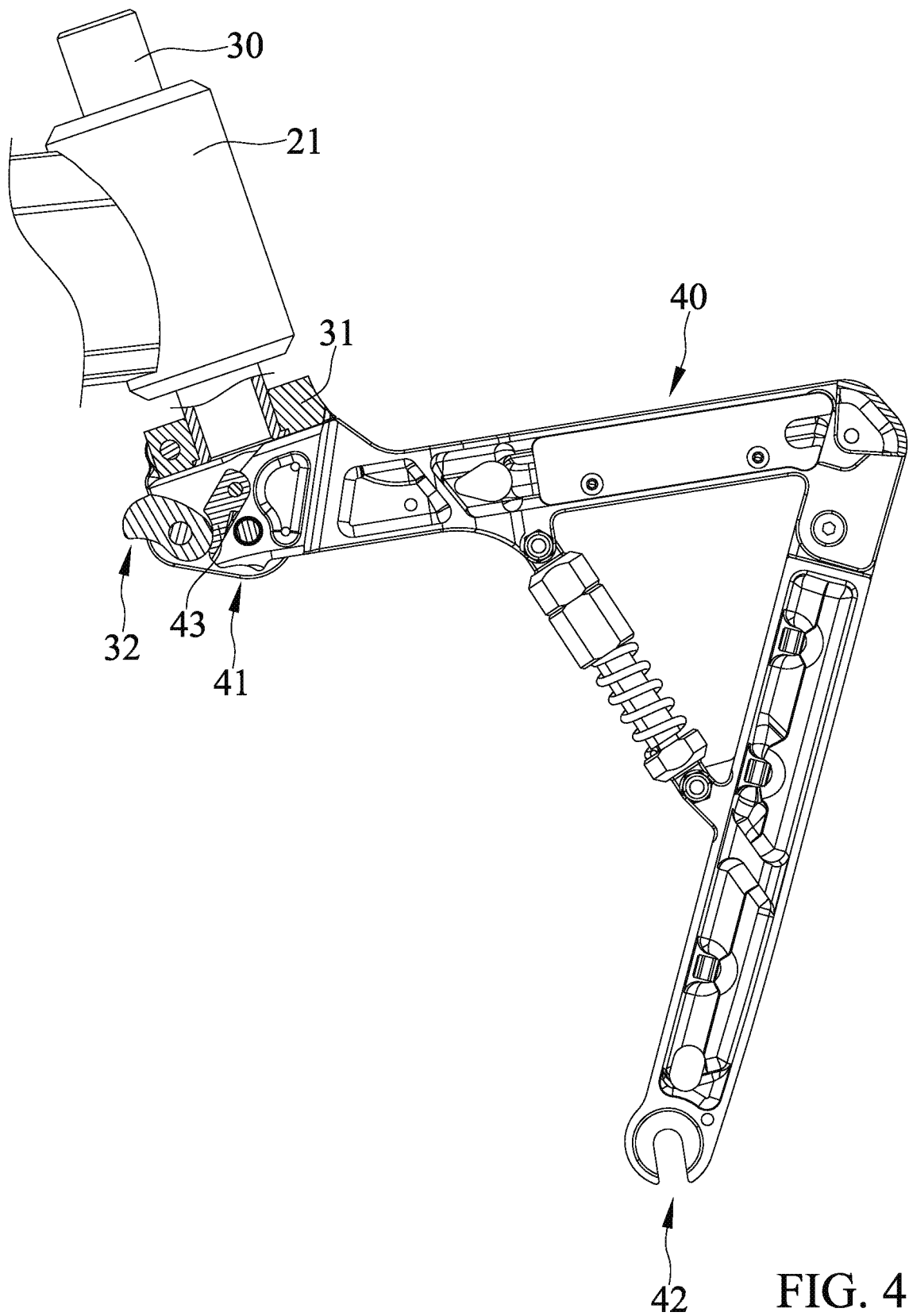
FIG. 4 is a cross-sectional view showing the bicycle folding mechanism of FIG. 1 including a front fork in a deployed position and a locking member in a locked position.
Figure 5:
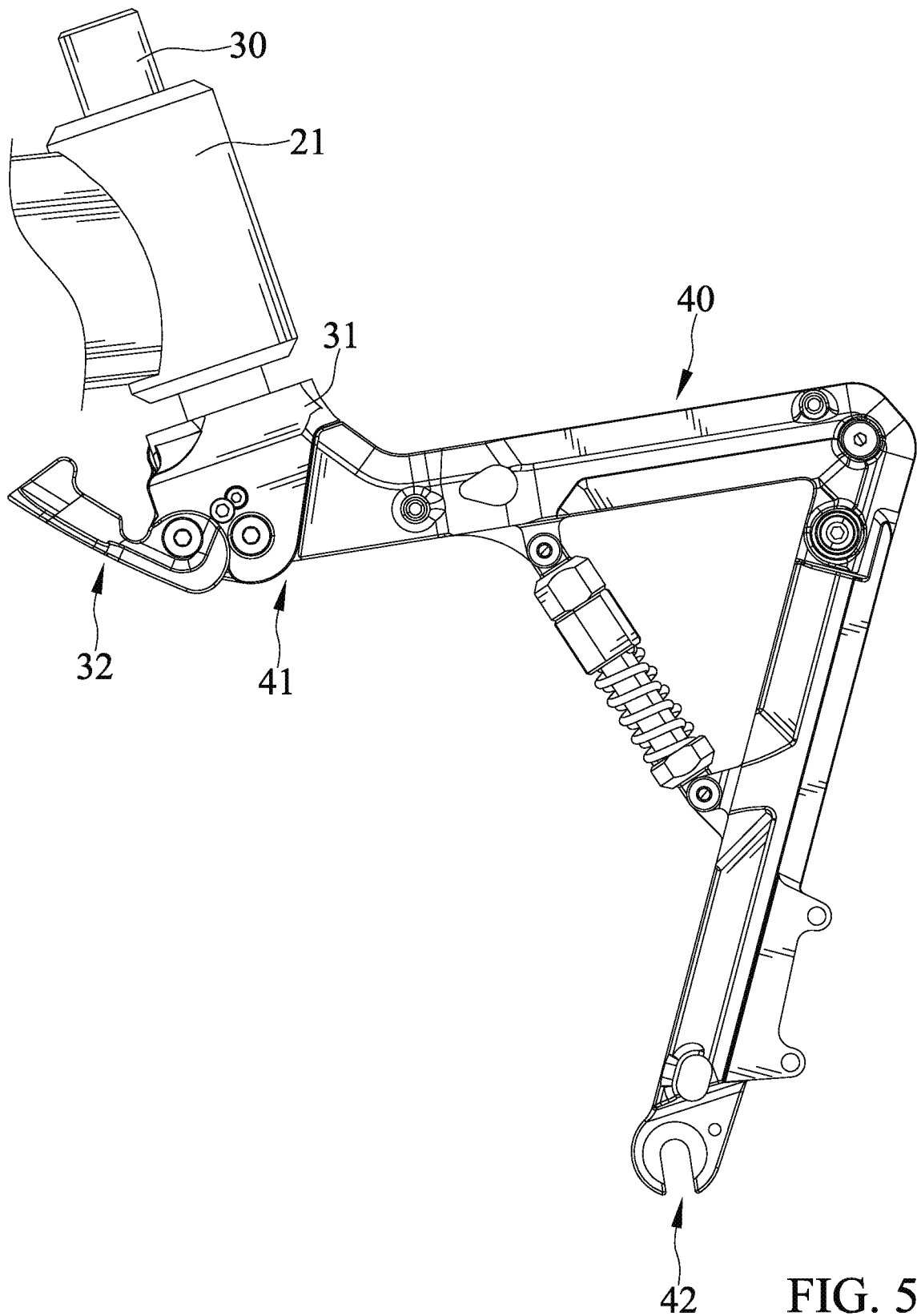
FIG. 5 is a cross-sectional view showing the bicycle folding mechanism of FIG. 1 including the front fork in the deployed position and the locking member in a release position.
Figure 6:
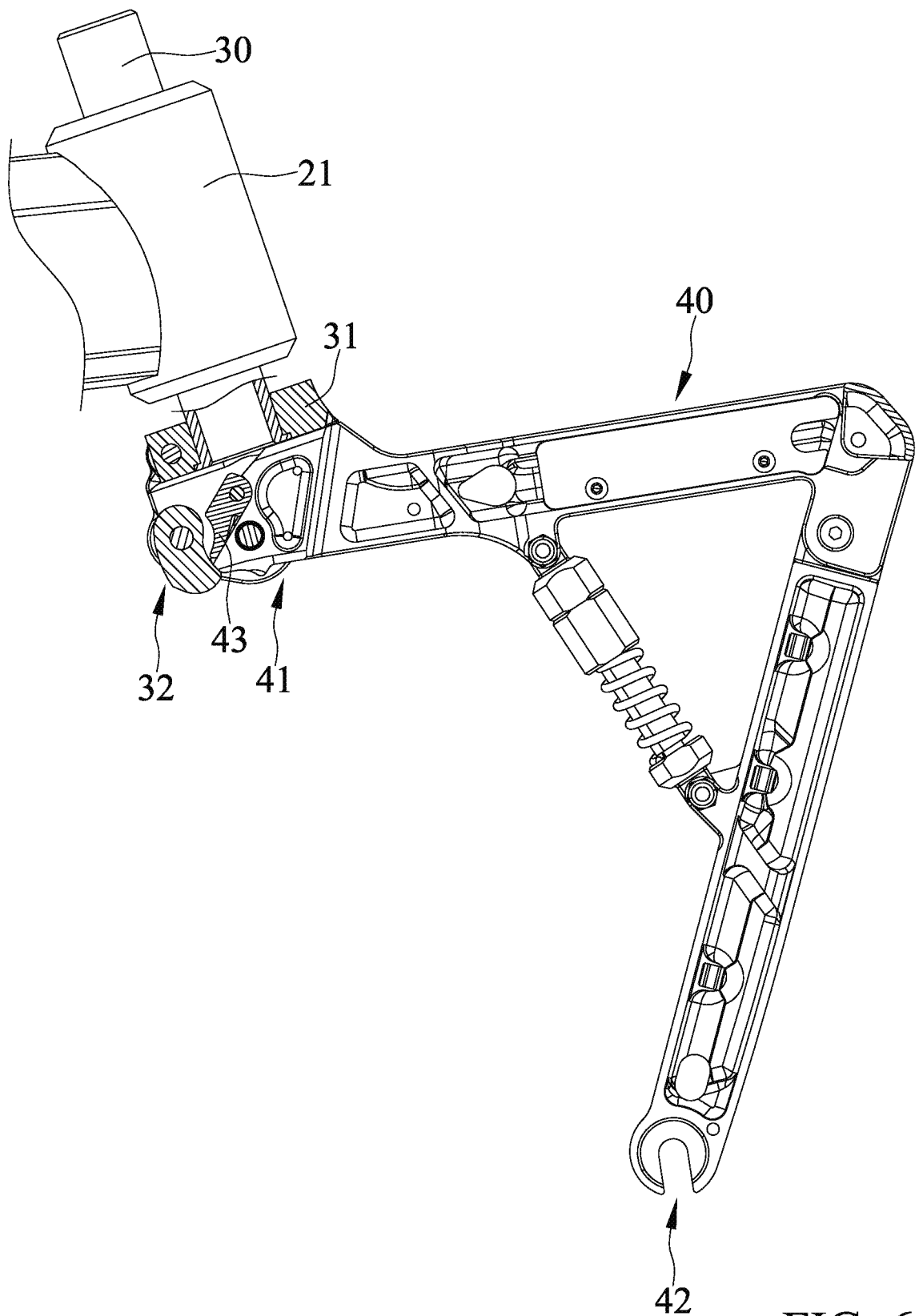
FIG. 6 is a cross-sectional view showing the bicycle folding mechanism of FIG. 1 including the front fork in the deployed position and the locking member in the release position.
Figure 7:
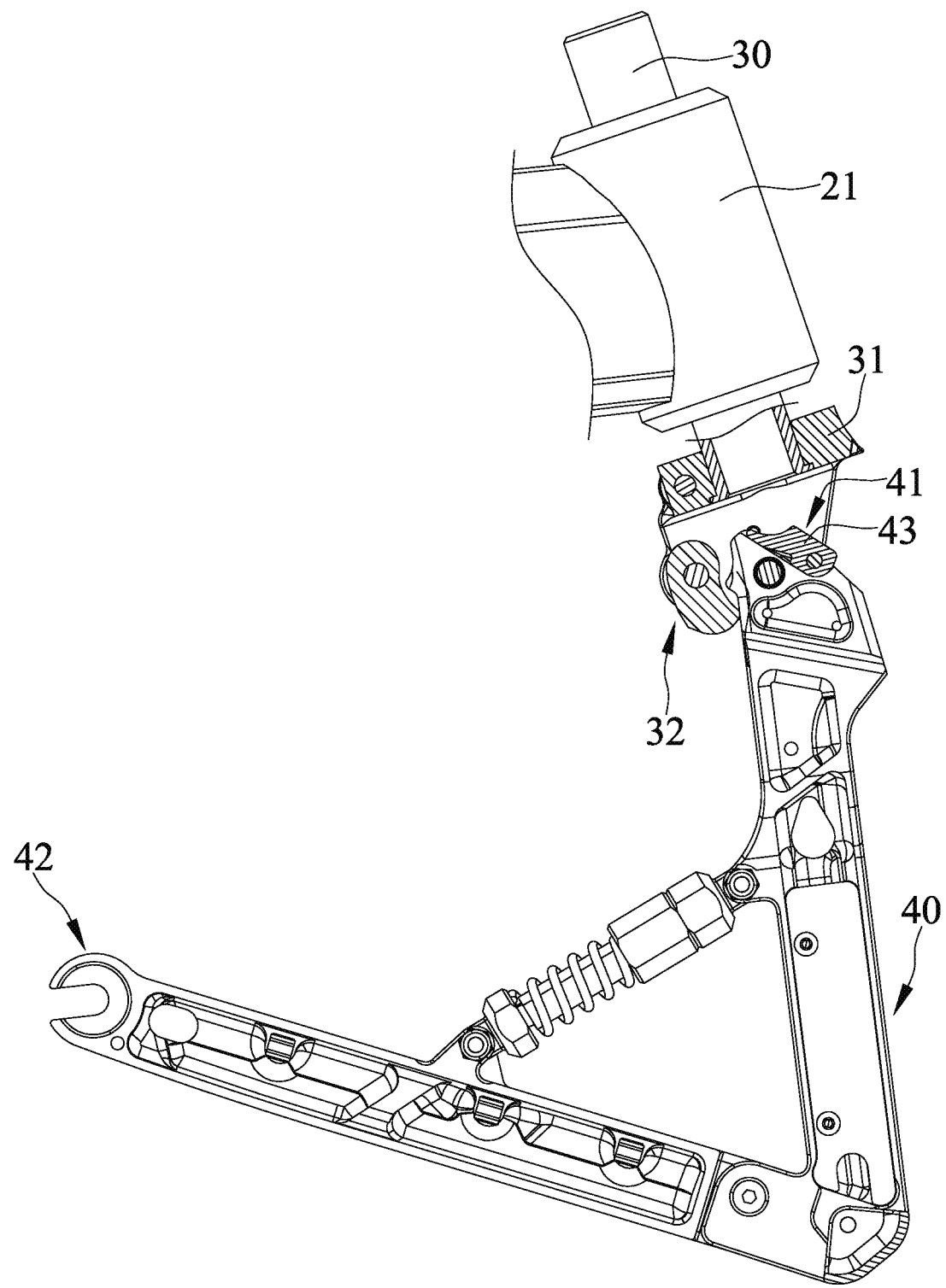
FIG. 7 is a cross-sectional view showing the bicycle folding mechanism of FIG. 1 including the front fork in a folded position.
Figure 8:
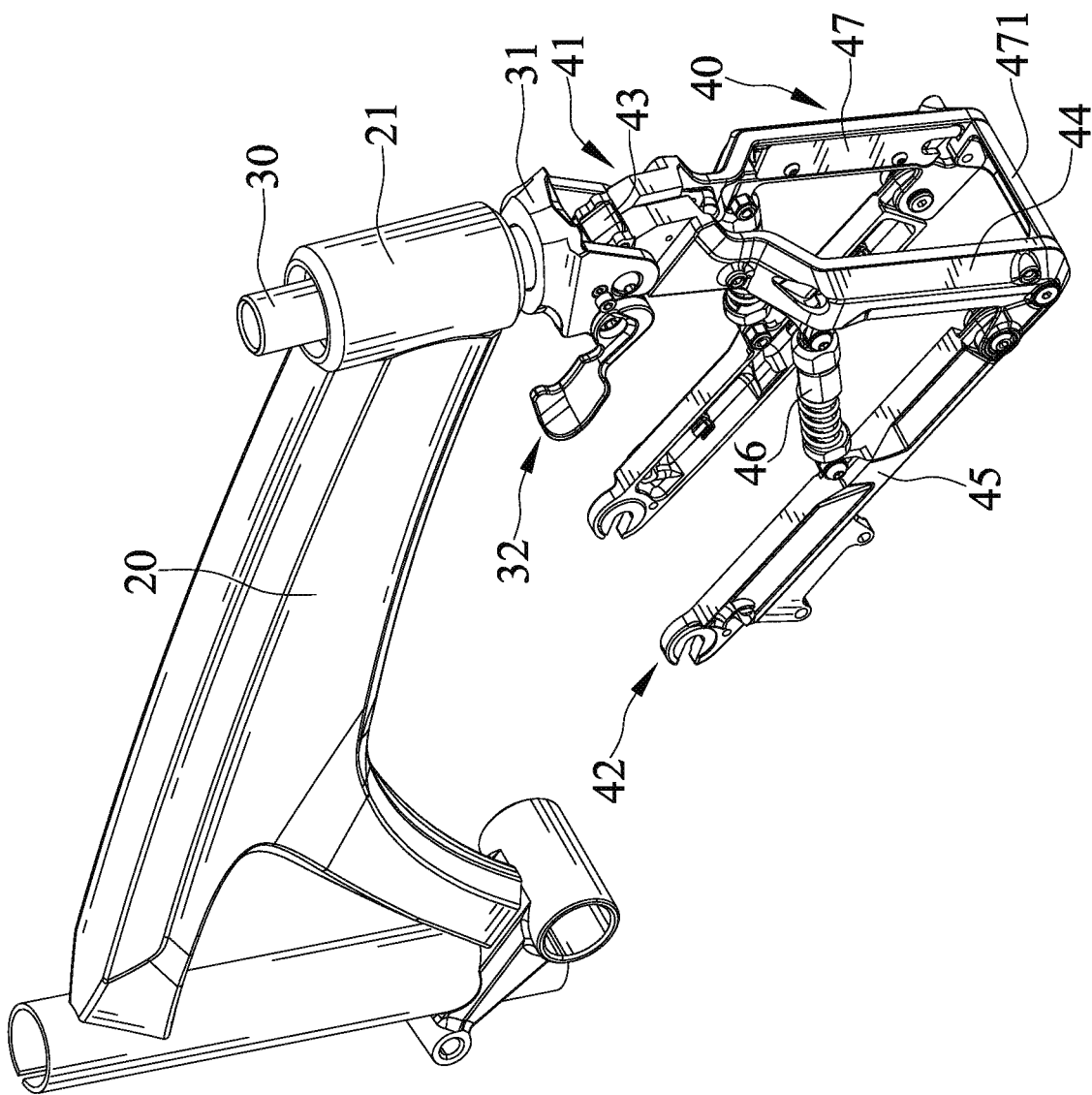
FIG. 8 is a perspective view showing the bicycle folding mechanism of FIG. 1 including the front fork in the folded position.

FIGS. 1 through 8 show a folding mechanism 10 of a bicycle in accordance with a first embodiment of the present invention. The bicycle folding mechanism 10 includes a frame 20, a stem 30, and a front fork 40.

The frame 20 includes a front tube 21 at an end thereof.

The stem 30 is inserted into the front tube 21. The stem 30 is connected and pivotal relative to the frame 20. The stem 30 has an end which is adjacent to the frame 20. The end of the stem 30 is connected with a connecting seat 31 the connecting seat 31 rotates in synchronization with the stem 30 upon pivoting the stem with respect to the frame 20. The connecting seat 31 is connected with a locking member 32. The connecting seat 31 defines a hole and the stem 30 is inserted into the hole. The locking member 32 is pivotally connected and is pivotal relative to the connecting seat 31.

The front fork 40 includes at least one connecting end 41 and at least one front end 42 on opposite ends. The at least one connecting end 41 is connected and pivotal relative to the connecting seat 31 such that the front fork 40 is pivotal relative to the connecting seat 31. The front fork 40 is pivotal between a deployed position in which the at least one front end 42 is positioned away from the frame 20 and a folded position in which the at least one front end 42 is positioned adjacent to the frame 20. The front fork 40 includes at least one upper arm 44, at least one lower arm 45, and at least one shock absorber 46. The at least one upper arm 44 has a first end, which includes the at least one connecting end 41, and a second end on opposite ends. The at least one lower arm 45 has a first end, which is pivotally connected with the second end of the at least one upper arm 44, and a second end, which includes the at least one front end 42, on opposite ends. The at least one shock absorber 46 includes a first end, which is connected with the at least one upper arm 44, and a second end, which is connected with the at least one lower arm 45, on opposite ends. The at least one upper arm 44 includes a first and second upper arm 44 and 47 disposed side by side in a spaced relationship. The first and second upper arm 44 and 47 include a connecting rod 471 connected therewith and extending therebetween. The at least one lower arm 45 includes a first and second lower arm 45 and 48 disposed side by side in a spaced relationship. The at least one shock absorber includes a first and second shock absorber 46 and 49 disposed side by side in a spaced relationship. The pushing member 43 is disposed adjacent to the first ends of the first and second upper arms 44, 44a, and 47.

The locking member 32 is pivotal relative to the connecting seat 31 between a locked position in which the front fork 40 is unmovable with respect to the connecting seat 31 and a released position in which the front fork 40 is pivotal relative to the stem 30. The at least one connecting end 41 of the front fork 40 includes a pushing member 43 configured to selectively abut the locking member 32 tightly. The locking member 32 disposed in the released position disengages from the pushing member 43. The locking member 32 disposed in the locked position tightly abuts the pushing member 43.

Figure 9:
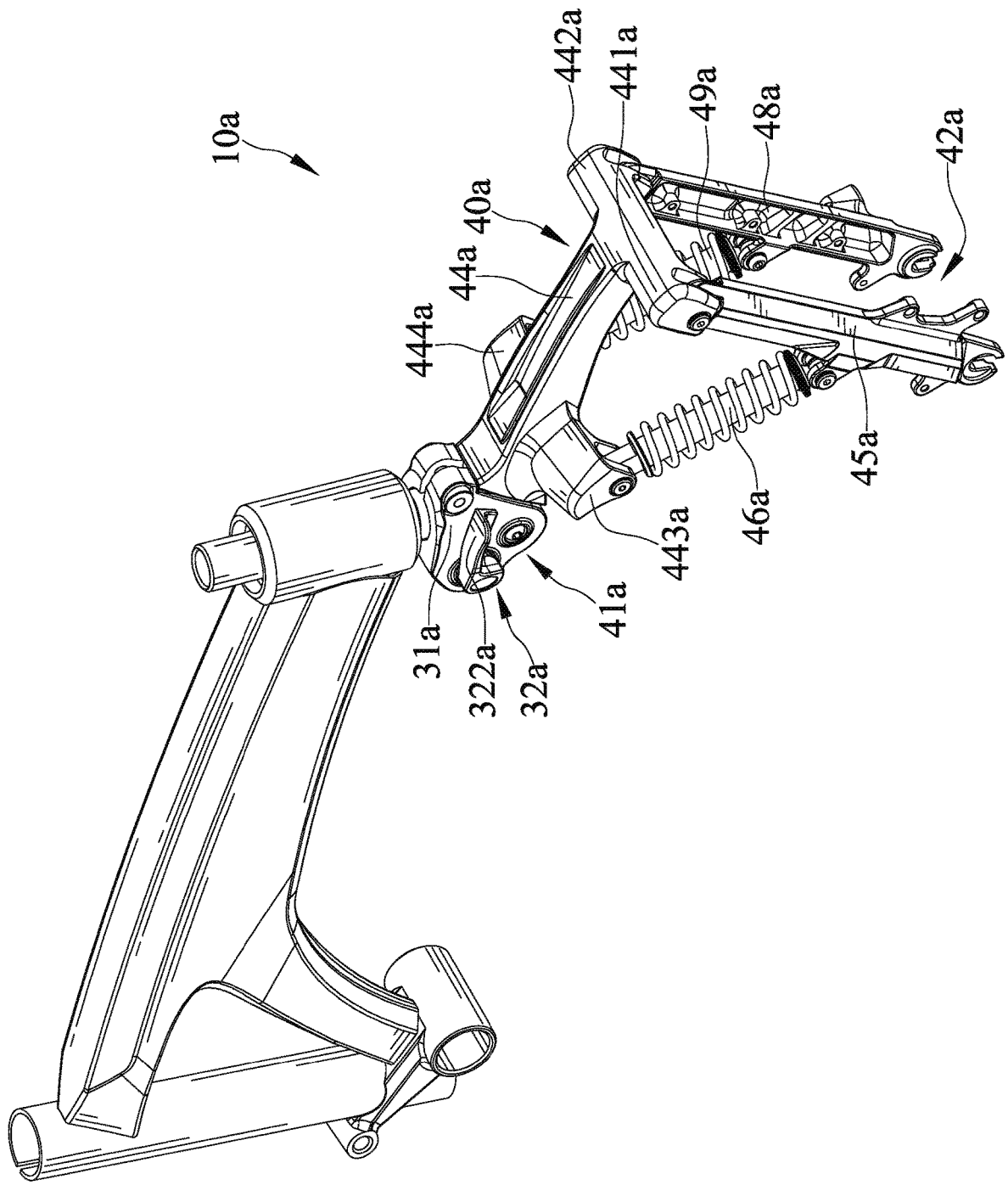
FIG. 9 is a perspective view of a bicycle folding mechanism according to a second embodiment of the present invention.
Figure 10:
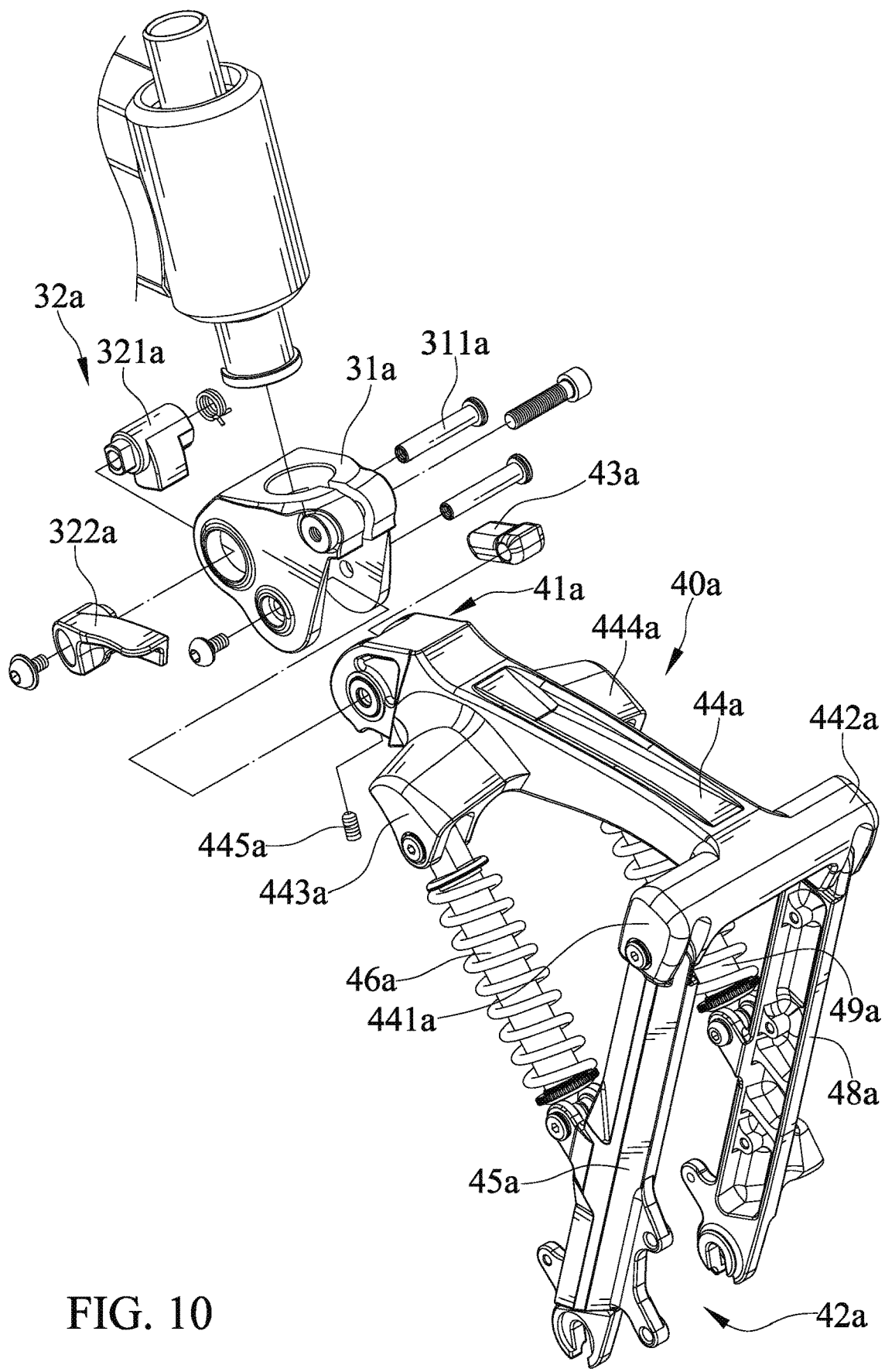
FIG. 10 is an exploded perspective view of the bicycle folding mechanism of FIG. 9.
Figure 11:
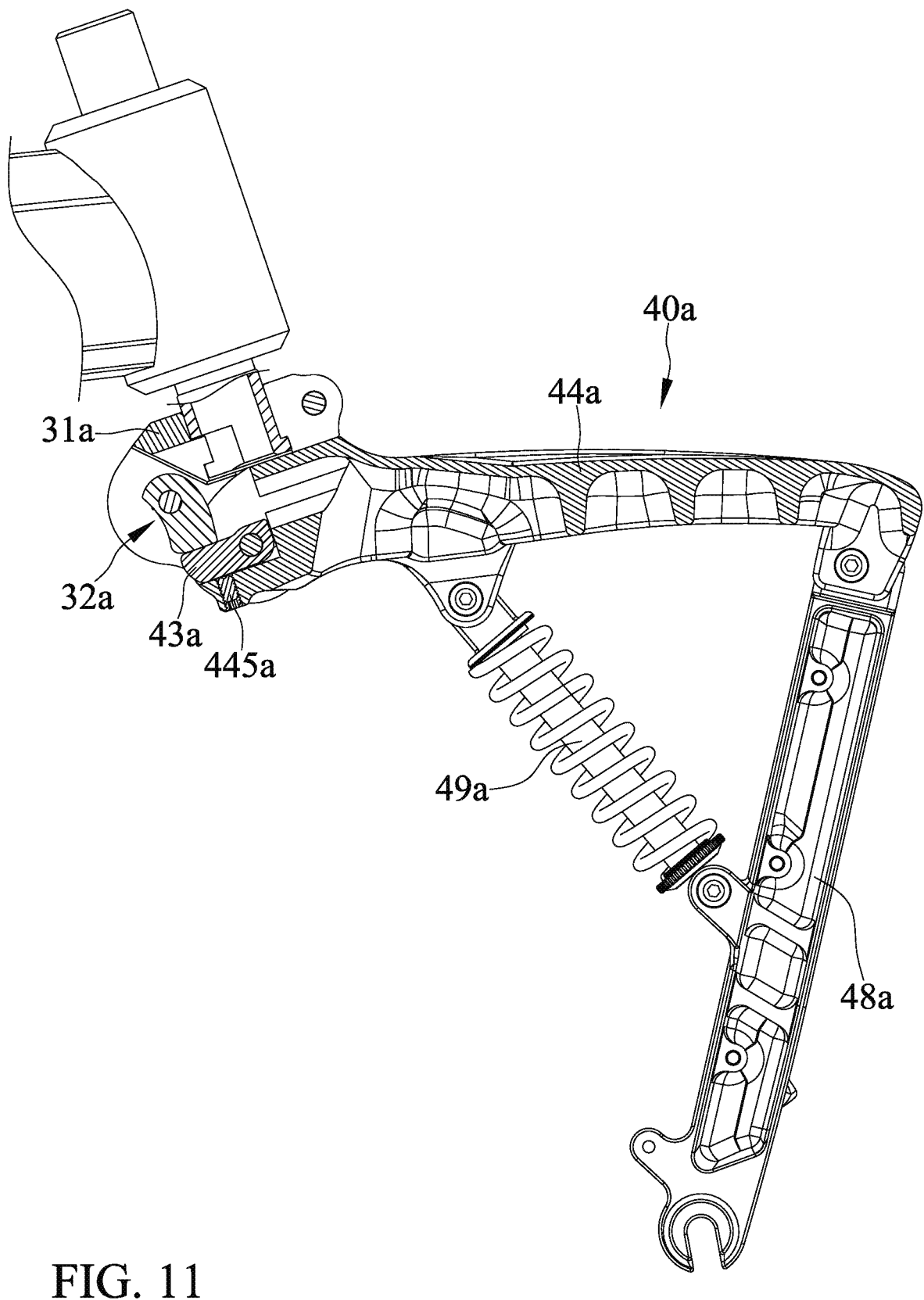
FIG. 11 is a cross-sectional structural view of the bicycle folding mechanism of FIG. 9.
Figure 12:
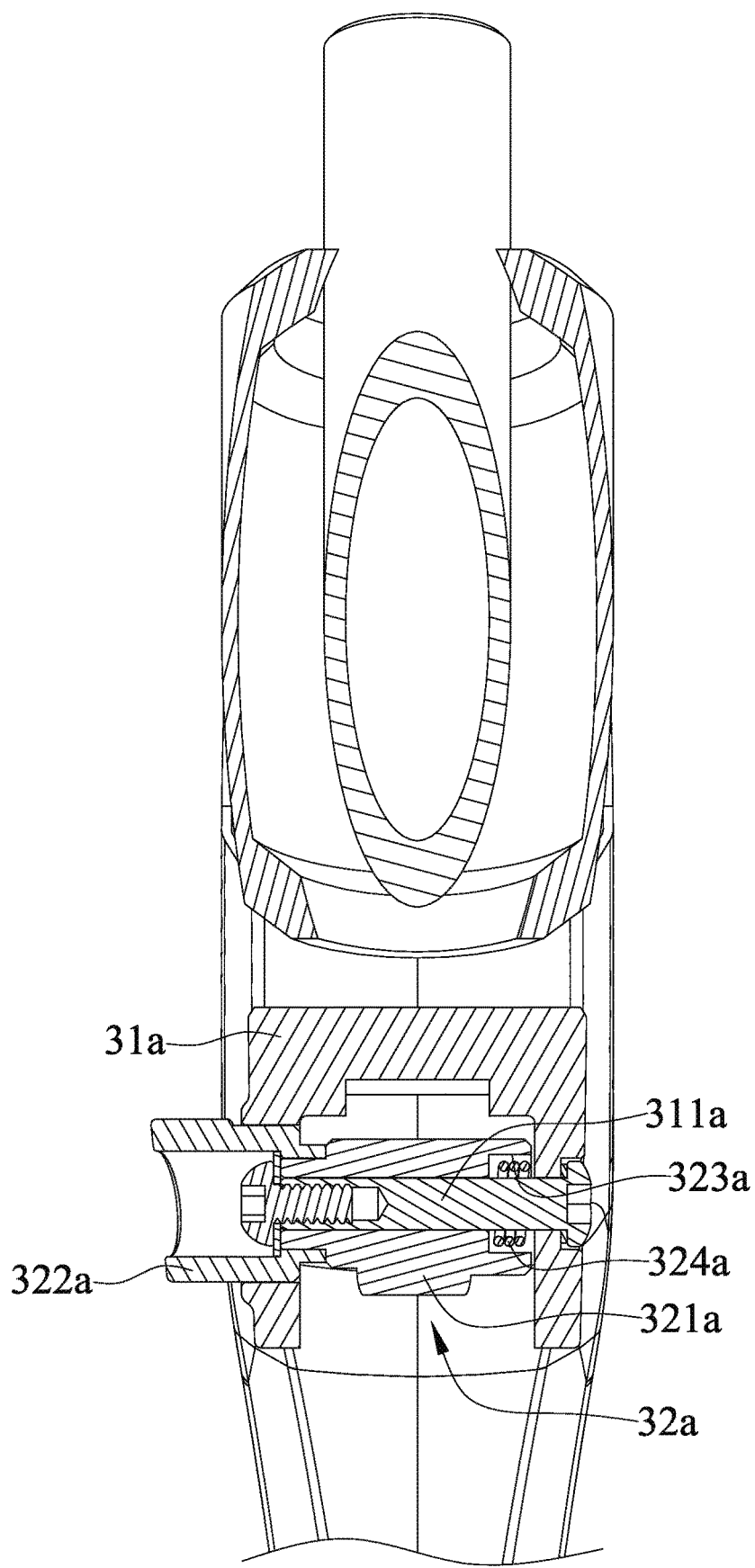
FIG. 12 is a cross-sectional view showing a locking member and a torsion spring of the bicycle folding mechanism of FIG. 9.
Figure 13:
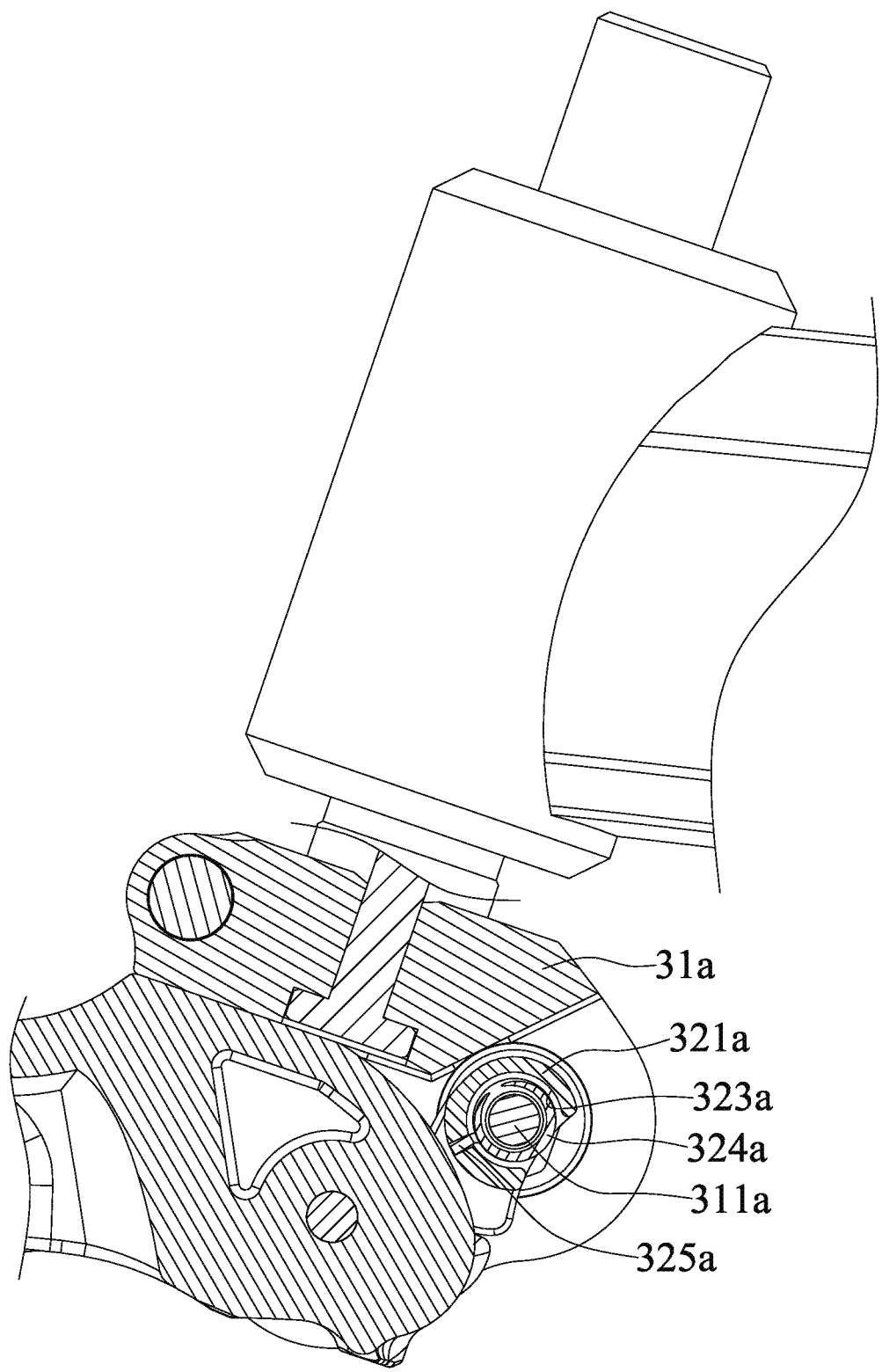
FIG. 13 is another cross-sectional view showing the locking member and the torsion spring of the bicycle folding mechanism of FIG. 9.
Figure 14:
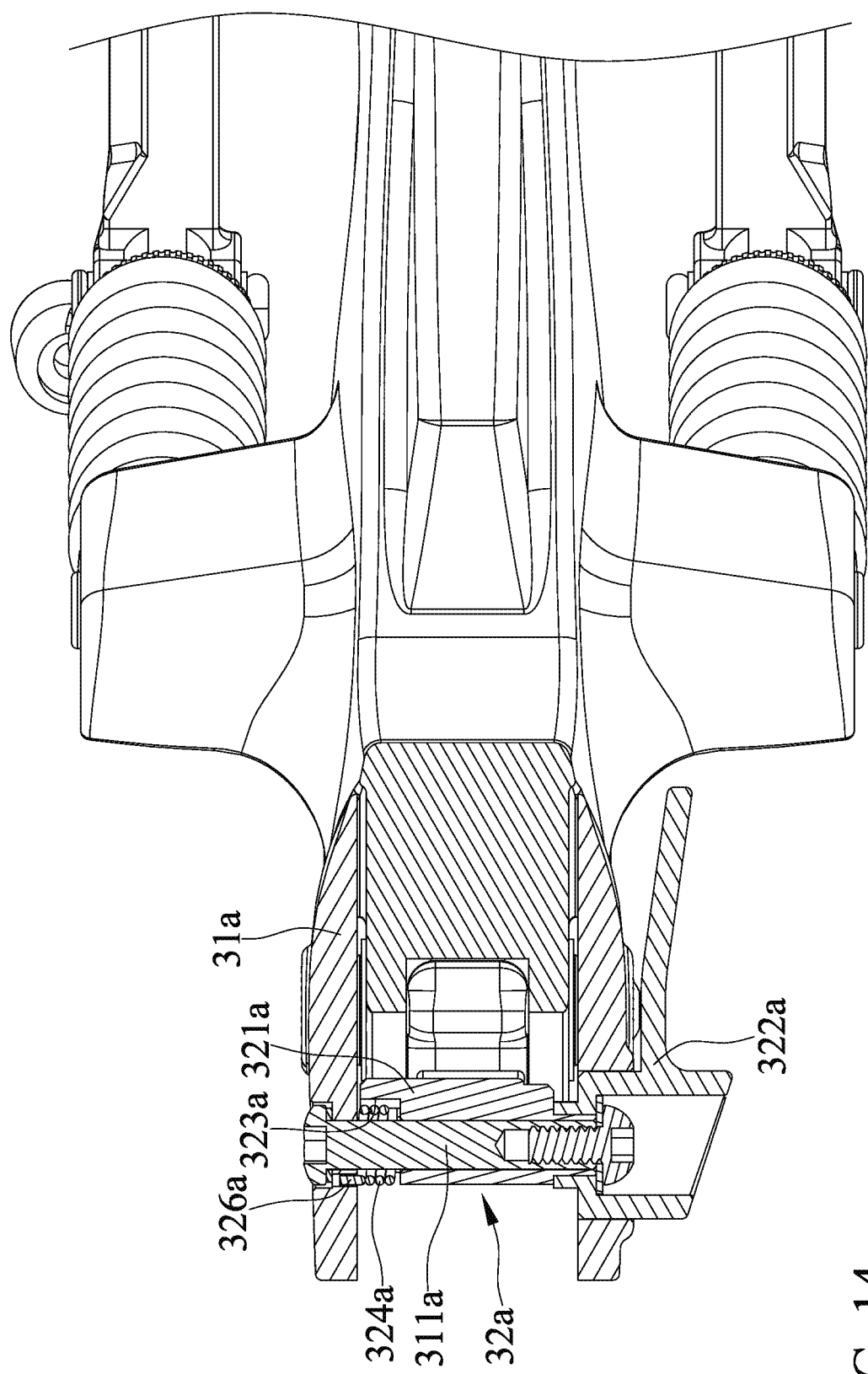
FIG. 14 is another cross-sectional view showing the locking member and the torsion spring of the bicycle folding mechanism of FIG. 9.
Figure 15:
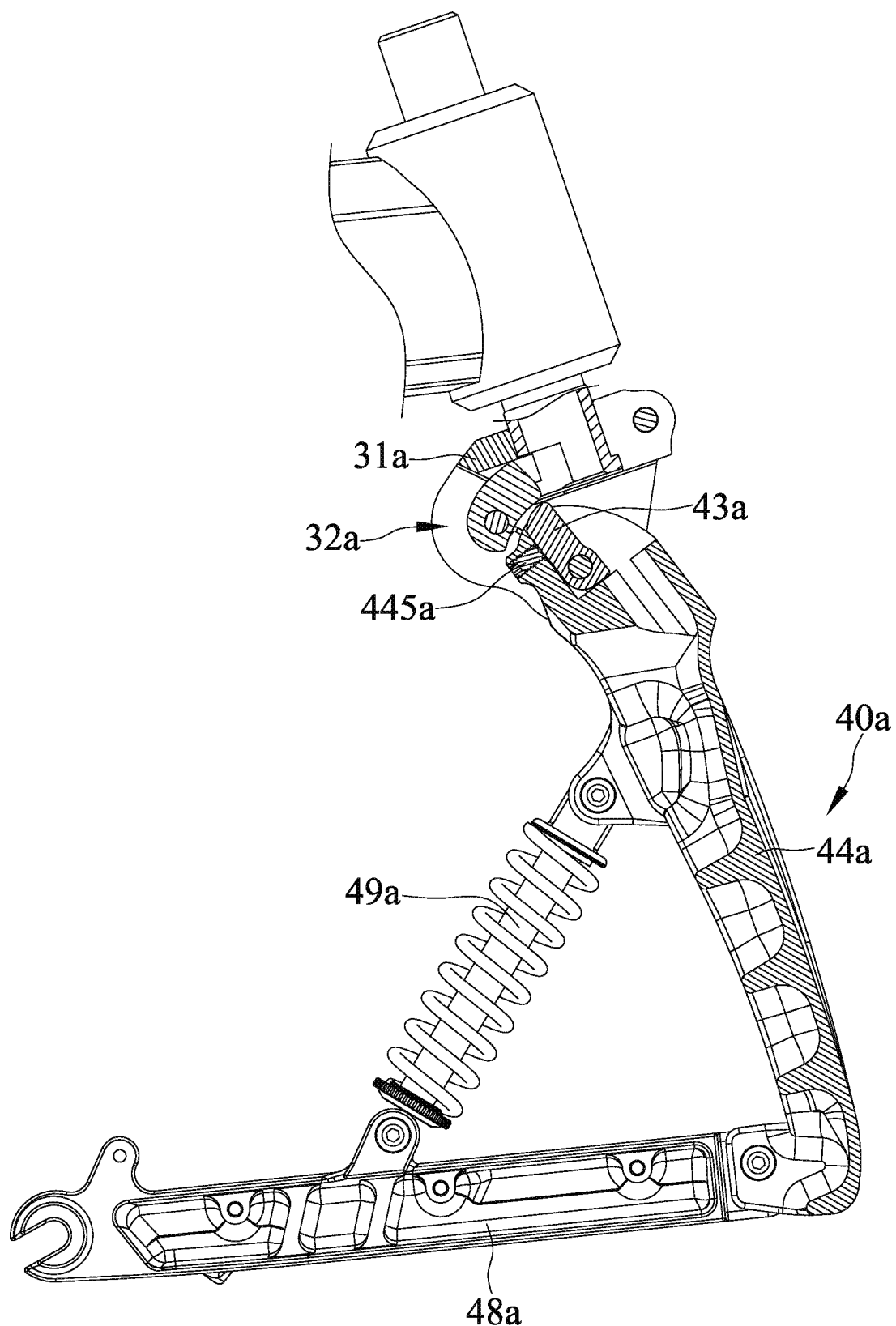
FIG. 15 is a cross-sectional view showing the bicycle folding mechanism of FIG. 9 including a front fork in a folded position.
Figure 16:
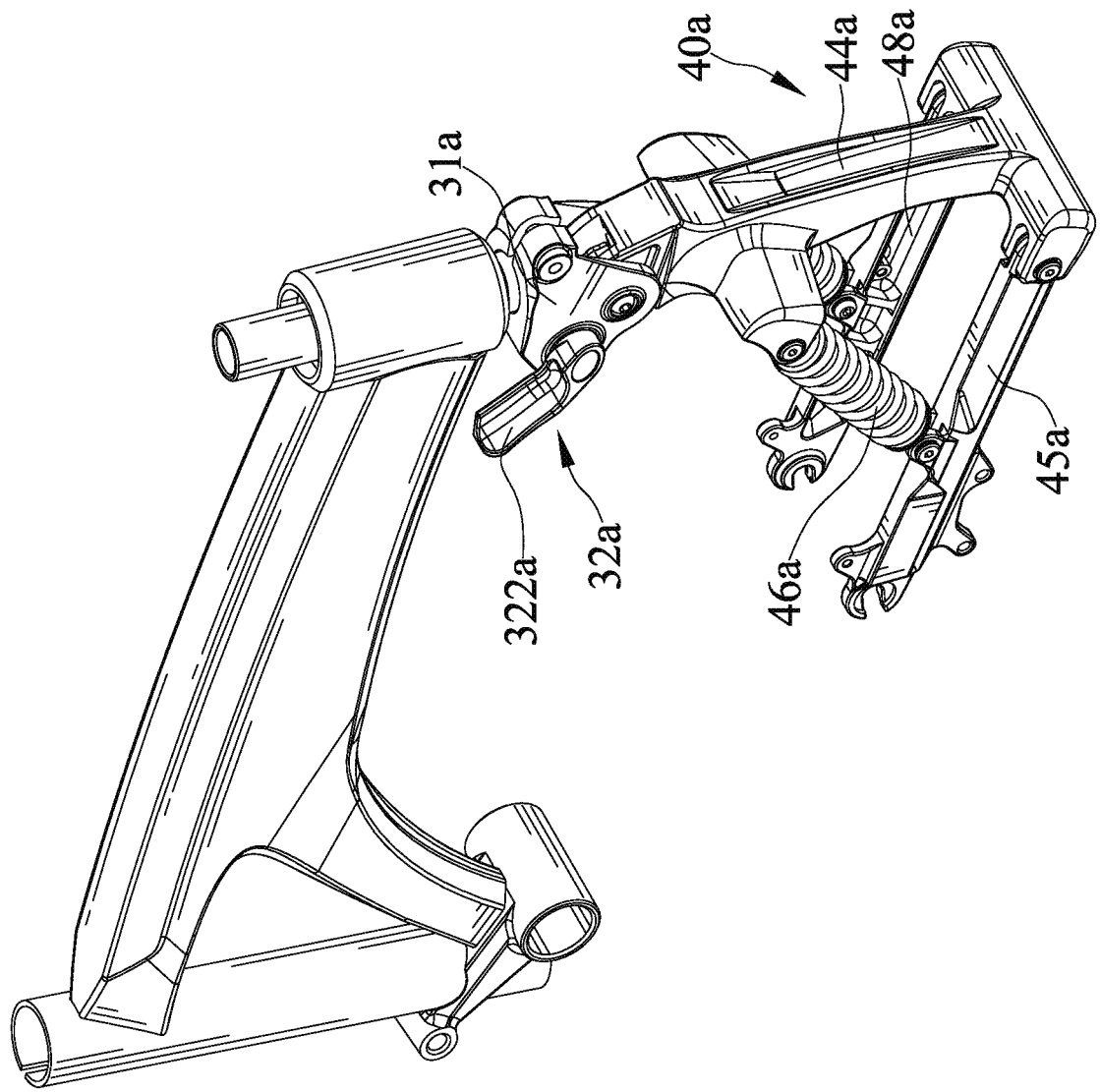
FIG. 16 is a perspective view showing the bicycle folding mechanism of FIG. 9 including the front fork in the folded position.

FIGS. 9 through 16 show a folding mechanism 10a in accordance with a second embodiment of the present invention, and the same numbers are used to correlate similar components of the first embodiment, but bearing a letter a. The second embodiment is similar to the first embodiment. A front fork 40a includes at least one connecting end 41a and at least one front end 42a on opposite ends. The at least one connecting end 41a is connected and pivotal relative to a connecting seat 31a such that the front fork 40a is pivotal relative to the connecting seat 31a. The front fork 40a includes at least one upper arm 44a, at least one lower arm 45a, and at least one shock absorber 46a. The at least one upper arm 44a has a first end, which includes the at least one connecting end 41a, and a second end on opposite ends. The at least one lower arm 45a has a first end, which is pivotally connected with the second end of the at least one upper arm 44a, and a second end, which includes the at least one front end 42a, on opposite ends. The at least one lower arm 45a includes a first and second lower arm 45a and 48a disposed side by side in a spaced relationship. The at least one shock absorber 46a includes a first and second shock absorber 46a and 49a disposed side by side in a spaced relationship. The at least one upper arm 44a includes a pushing member 43a connected therewith and disposed adjacent to a first end thereof. The second embodiment differentiates from the first embodiment in that that the at least one upper arm 44a includes one upper arm 44. The upper arm 44a has an integrally formed one-piece structure. The upper arm 44a includes a first side, which includes a first connecting flange 441a protruding therefrom, and a second side, which includes a second connecting flange 442a protruding therefrom, on opposite sides. The first and second lower arms 45a and 48a are pivotally connected with the first and second connecting flanges 441a and 442a respectively. The upper arm 44a includes the first side including a third connecting flange 443a protruding therefrom and the second side including a fourth connecting flange 444a protruding therefrom. The first and second shock absorbers 46a and 49a are connected with the third and fourth connecting flanges 443a and 444a respectively. Further, the pushing member 43a is movably connected with the upper arm 44a and is moved by adjusting an adjusting member 445a. The adjusting member 445a is movably connected with the upper arm 44a. The pushing member 43a is pivotally connected with the upper arm 44a. The adjusting member 445a is in thread engagement with the upper arm 44a. The locking member 32a and the adjusting member 445a are disposed on opposite sides of the pushing member 43a. Further, the locking member 32a, which is in the form of a fastening block 321a, is pivotally connected with a connecting seat 31a. The fastening block 321a is connected with a handle 322a such that the fastening block 321a is pivoted with respect to the connecting seat 31a in response to the operational movement of the handle 322a. The fastening block 321a is pivotal about a pivot 311a. The pivot 311a inserts into the connecting seat 321a and the fastening block 321a. The fastening block 321a defines a compartment 323a and a torsion spring 324a is disposed in the compartment 323a. The pivot 311a inserts into the torsion spring 324a. The torsion spring 324a includes a first end 325a, which is retained on the fastening block 321a, and a second end 326a, which is retained on the connecting seat 31a, on opposite ends.

Figure 17:
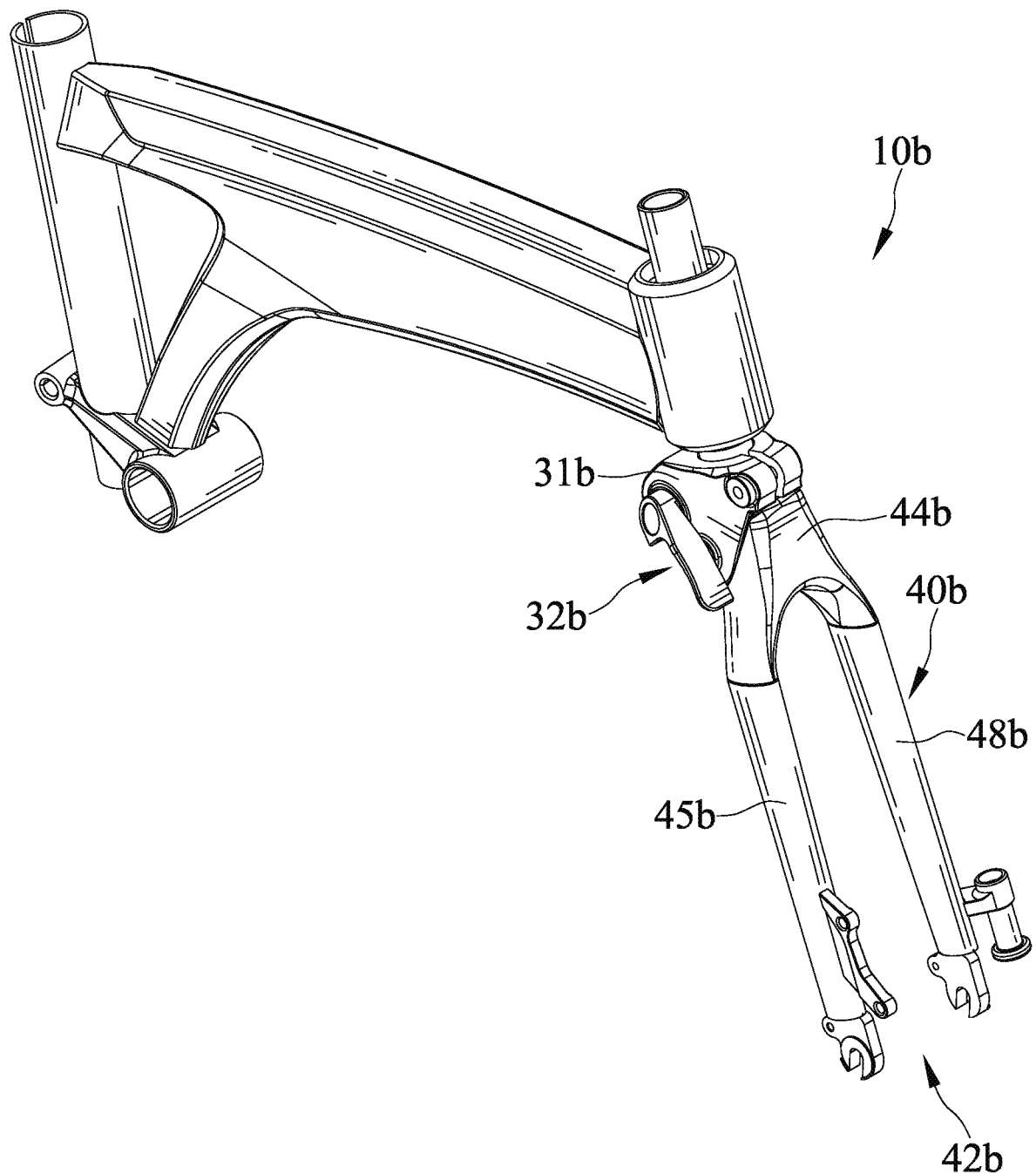
FIG. 17 is a perspective view of a bicycle folding mechanism according to a third embodiment of the present invention.
Figure 18:
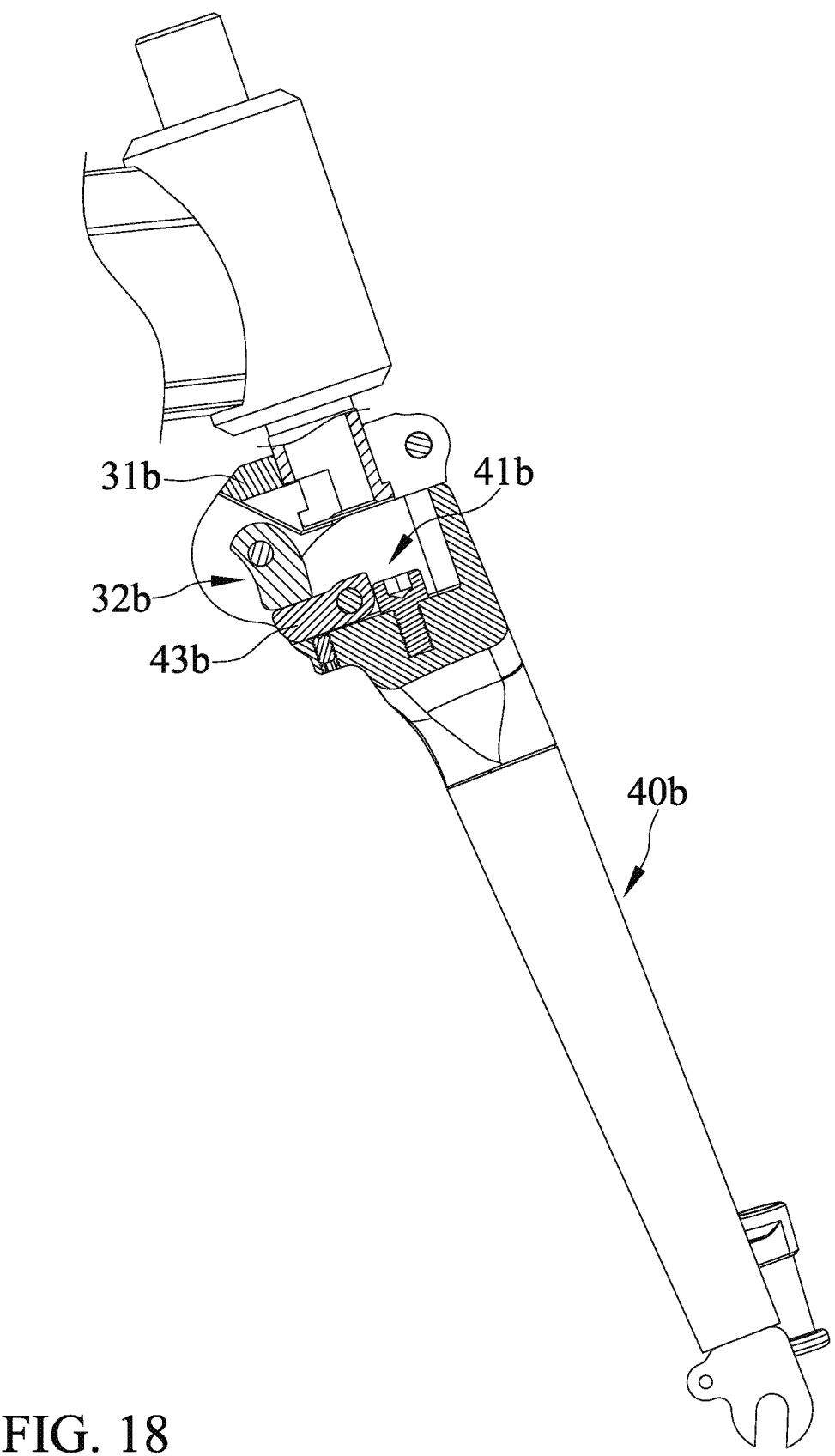
FIG. 18 is a cross-sectional structural view of the bicycle folding mechanism of FIG. 17.
Figure 19:
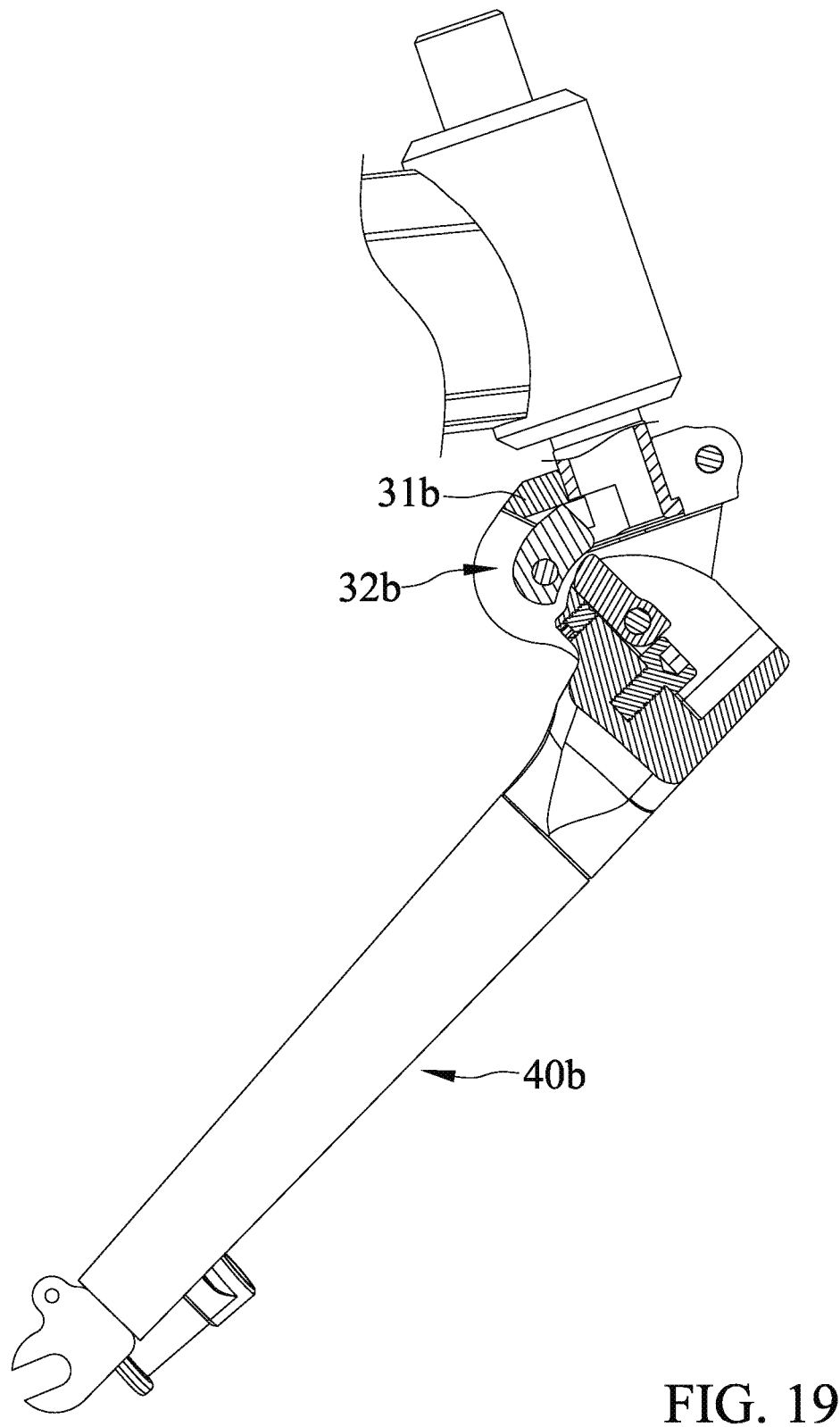
FIG. 19 is a cross-sectional view showing the bicycle folding mechanism of FIG. 17 including a front fork in a folded position.
Figure 20:
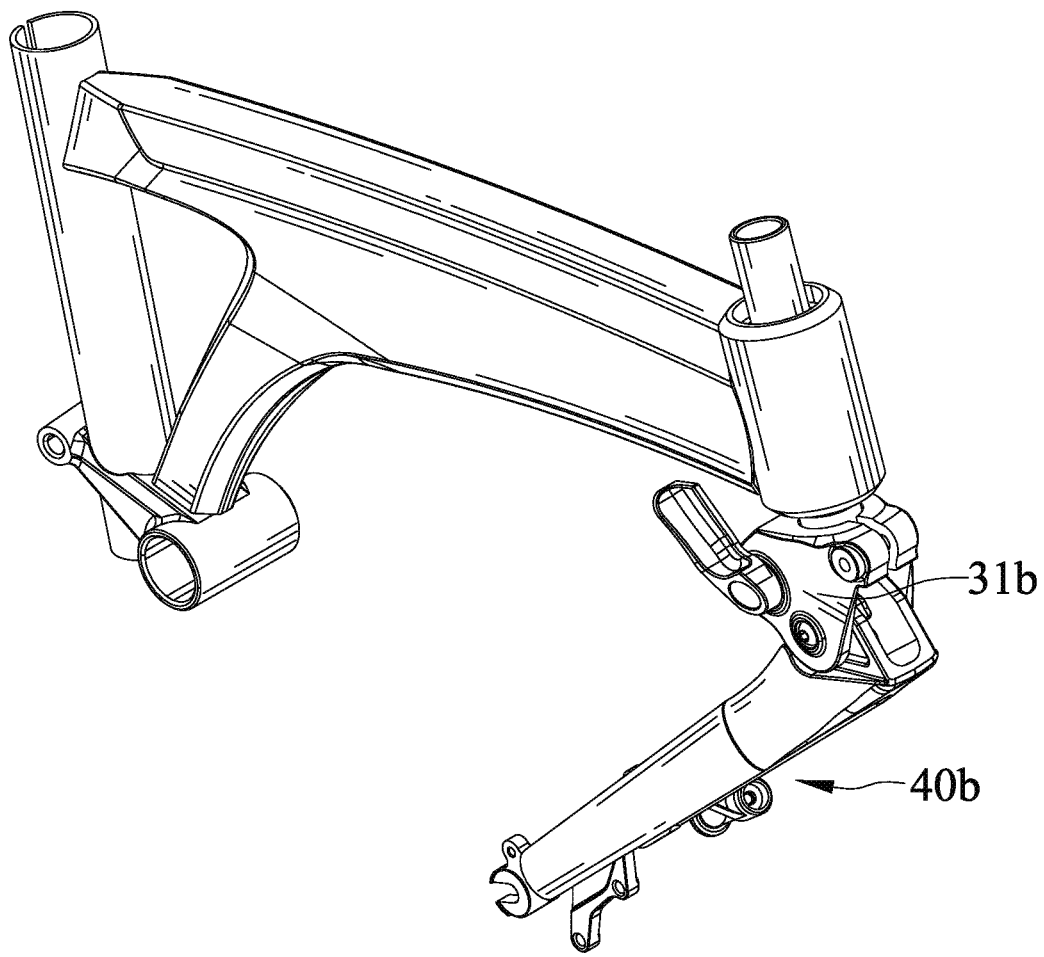
FIG. 20 is a perspective view showing the bicycle folding mechanism of FIG. 17 including the front fork in the folded position.

FIGS. 17 through 20 show a folding mechanism 10a in accordance with a third embodiment of the present invention, and the same numbers are used to correlate similar components of the first embodiment, but bearing a letter b. The third embodiment is similar to the second embodiment. A front fork 40b includes at least one connecting end 41b and at least one front end 42b on opposite ends. The at least one connecting end 41b is connected and pivotal relative to a connecting seat 31b such that the front fork 40b is pivotal relative to the connecting seat 31b. The front fork 40b includes at least one upper arm 44b and at least one lower arm 45b. The at least one upper arm 44b has a first end, which includes the at least one connecting end 41b, and a second end on opposite ends. The at least one lower arm 45b has a first end, which is pivotally connected with the second end of the at least one upper arm 44b, and a second end, which includes the at least one front end 42b, on opposite ends. The at least one lower arm 45b includes a first and second lower arm 45b and 48b disposed side by side in a spaced relationship. The at least one upper arm 44b includes one upper arm 44b. The upper arm 44b has an integrally formed one-piece structure. The upper arm 44b includes a pushing member 43b connected therewith and disposed adjacent to a first end thereof. The third embodiment differentiates from the second embodiment in that that the upper arm 44b and the first and second lower arm 45b and 48b are integrally formed as a single piece and the first and second lower arms 45b and 48b bifurcate from the upper arm 44b.

In view of the forgoing, the bicycle folding mechanism 10, 10a, 10b have a simple structure. The front forks 40, 40a, 40b are connected and pivotal relative to the connecting seats 31 and 31a and can be folded toward the frame 20. Therefore, the front forks 40, 40a, 40b disposed in the folded position don't occupy a relative large storage space.

The foregoing is merely illustrative of the principles of this invention, and various modifications can be made by those skilled in the art without departing from the scope and spirit of the invention.

What is claimed is:
1. A bicycle folding mechanism comprising:
a frame, wherein the frame includes a front tube at an end thereof;
a stem, wherein the stem is inserted into the front tube, wherein the stem is connected and pivotal relative to the frame, wherein the stem has an end, which is adjacent to the frame, connected with a connecting seat and the connecting seat rotates in synchronization with the stem upon pivoting the stem with respect to the frame; and
a front fork, wherein the front fork includes at least one connecting end and at least one front end on opposite ends, wherein the at least one connecting end is connected and pivotal relative to the connecting seat such that the front fork is pivotal relative to the connecting seat, and wherein the front fork is pivotal between a deployed position in which the at least one front end is positioned away from the frame and a folded position in which the at least one front end is positioned adjacent to the frame,
wherein the connecting seat includes a locking member pivotally connected therewith and being pivotal between a locked position in which the front fork is unmovable with respect to the connecting seat and a released position in which the front fork is pivotal relative to the connecting seat, wherein the at least one connecting end of the front fork includes a pushing member configured to selectively abut the locking member tightly, wherein the locking member disposed in the released position disengages from the pushing member, and wherein the locking member disposed in the locked position tightly abuts the pushing member.
2. The bicycle folding mechanism as claimed in claim 1, wherein the front fork includes at least one upper arm and at least one lower arm, wherein the at least one upper arm has a first end, which includes the at least one connecting end, and a second end on opposite ends, wherein the at least one lower arm has a first end, which is pivotally connected with the second end of the at least one upper arm, and a second end, which includes the at least one front end, on opposite ends, and at least one shock absorber including a first end, which is connected with the at least one upper arm, and a second end, which is connected with the at least one lower arm, on opposite ends.
3. The bicycle folding mechanism as claimed in claim 2, wherein the at least one upper arm includes a first and second upper arm disposed side by side in a spaced relationship, wherein the at least one lower arm includes a first and second lower arm disposed side by side in a spaced relationship, wherein the at least one shock absorber includes a first and second shock absorber disposed side by side in a spaced relationship, and wherein the pushing member is disposed adjacent to the first ends of the first and second upper arms.

4. The bicycle folding mechanism as claimed in claim 3 further comprising a connecting rod connected with and extending between the first and second upper arms.

5. The bicycle folding mechanism as claimed in claim 2, wherein the at least one lower arm includes a first and second lower arm disposed side by side in a spaced relationship, wherein the at least one shock absorber includes a first and second shock absorber disposed side by side in a spaced relationship, and wherein the pushing member is disposed adjacent to the first end of the at least one upper arm.

6. The bicycle folding mechanism as claimed in claim 5, wherein the locking member is in the form of a fastening block pivotally connected with the connecting seat, and wherein the fastening block is connected with a handle such that the fastening block is pivoted with respect to the connecting seat in response to the operational movement of the handle.

7. The bicycle folding mechanism as claimed in claim 5, wherein the at least one upper arm has an integrally formed one-piece structure, wherein the at least one upper arm includes a first side, which includes a first connecting flange protruding therefrom, and a second side, which includes a second connecting flange protruding therefrom, on opposite sides, wherein the first and second lower arms are pivotally connected with the first and second connecting flanges respectively, wherein the at least one upper arm includes the first side including a third connecting flange protruding therefrom and the second side including a fourth connecting flange protruding therefrom, and wherein the first and second shock absorbers are connected with the third and fourth connecting flanges respectively.

8. The bicycle folding mechanism as claimed in claim 7, wherein the locking member is in the form of a fastening block pivotally connected with the connecting seat, and wherein the fastening block is connected with a handle such that the fastening block is pivoted with respect to the connecting seat in response to the operational movement of the handle.

9. The bicycle folding mechanism as claimed in claim 7, wherein the pushing member is movably connected with the at least one upper arm and is moved by adjusting an adjusting member, and wherein the adjusting member is movably connected with the at least one upper arm.

10. The bicycle folding mechanism as claimed in claim 9, wherein the locking member is in the form of a fastening block pivotally connected with the connecting seat, and wherein the fastening block is connected with a handle such that the fastening block is pivoted with respect to the connecting seat in response to the operational movement of the handle.

11. The bicycle folding mechanism as claimed in claim 9, wherein the pushing member is pivotally connected with the at least one upper arm, wherein the adjusting member is in thread engagement with the at least one upper arm, and wherein the locking member and the adjusting member are disposed on opposite sides of the pushing member.

12. The bicycle folding mechanism as claimed in claim 11, wherein the locking member is in the form of a fastening block pivotally connected with the connecting seat, and wherein the fastening block is connected with a handle such that the fastening block is pivoted with respect to the connecting seat in response to the operational movement of the handle.

13. The bicycle folding mechanism as claimed in claim 2, wherein the locking member is in the form of a fastening block pivotally connected with the connecting seat, and wherein the fastening block is connected with a handle such that the fastening block is pivoted with respect to the connecting seat in response to the operational movement of the handle.

14. The bicycle folding mechanism as claimed in claim 1, wherein the locking member is in the form of a fastening block pivotally connected with the connecting seat, and wherein the fastening block is connected with a handle such that the fastening block is pivoted with respect to the connecting seat in response to the operational movement of the handle.

15. The bicycle folding mechanism as claimed in claim 1, wherein the front fork includes at least one upper arm and at least one lower arm, wherein the at least one upper arm has a first end, which includes the at least one connecting end, and a second end on opposite ends, wherein the at least one lower arm has a first end, which is pivotally connected with the second end of the at least one upper arm, and a second end, which includes the at least one front end, on opposite ends, wherein the at least one lower arm includes a first and second lower arm disposed side by side in a spaced relationship, wherein the at least one upper arm includes one upper arm, wherein the upper arm has an integrally formed one-piece structure, wherein the upper arm and the first and second lower arm are integrally formed as a single piece and the first and second lower arms bifurcate from the upper arm, and wherein the upper arm includes the pushing member connected therewith and disposed adjacent to a first end thereof.

* * * * *